US012783679B2

(12) United States Patent
Richards et al.

(10) Patent No.: US 12,783,679 B2
(45) Date of Patent: Nov. 3, 2026

(54) AUTHENTICATING COMMANDS TO CHANGE DEVICE FIRMWARE SETTINGS

(71) Applicant: Hewlett-Packard Development Company, L.P., Spring, TX (US)

(72) Inventors: Tevin Jaupaul Richards, Spring, TX (US); Erich Wolfgang Gerstacker McMillan, Spring, TX (US); Mason Andrew Gunyuzlu, Spring, TX (US); Robert Stephen Craig, Spring, TX (US); Thomas George Swann, Spring, TX (US); Khoa Dang Huynh, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 44 days.

(21) Appl. No.: 18/861,105

(22) PCT Filed: May 18, 2022

(86) PCT No.: PCT/US2022/029877
§ 371 (c)(1),
(2) Date: Oct. 28, 2024

(87) PCT Pub. No.: WO2023/224616
PCT Pub. Date: Nov. 23, 2023

(65) Prior Publication Data
US 2025/0291926 A1 Sep. 18, 2025

(51) Int. Cl.
*G06F 21/57* (2013.01)
*G06F 21/35* (2013.01)

(52) U.S. Cl.
CPC ............ *G06F 21/572* (2013.01); *G06F 21/35* (2013.01); *G06F 21/575* (2013.01)

(58) Field of Classification Search
CPC .. G06F 9/44505; G06F 21/572; G06F 21/575; G06F 21/42; H04L 63/18; H04L 63/0853
See application file for complete search history.

(56) References Cited

U.S. PATENT DOCUMENTS 5,937,063 A * 8/1999 Davis .................... G06F 21/575 713/189
2007/0245142 A1 10/2007 Rios et al.
2008/0148046 A1 6/2008 Glancey
2015/0154092 A1 6/2015 Chen
2019/0332775 A1* 10/2019 Savage ............... H04L 63/0823
(Continued)

*Primary Examiner* — Raymond N Phan
(74) *Attorney, Agent, or Firm* — Quarles & Brady LLP

(57) ABSTRACT

Examples of electronic devices are described herein. In some examples, an electronic device includes a communication interface. In some examples, the electronic device includes a Basic Input/Output System (BIOS). In some examples, the electronic device includes a processor to, in response to receiving a command to modify a setting of the BIOS, perform a first authentication. In some examples, the processor is to instruct the communication interface to send an authentication message to an external device in response to a first success of the first authentication. In some examples, the processor is to perform a second authentication based on a response message from the external device. In some examples, the processor is to, in response to a second success of the second authentication, modify the setting of the BIOS.

20 Claims, 5 Drawing Sheets

(56) References Cited

U.S. PATENT DOCUMENTS

| | | | | |
|---|---|---|---|---|
| 2022/0191049 | A1* | 6/2022 | Kohler .................. | H04L 9/3231 |
| 2023/0367860 | A1* | 11/2023 | Stewart ................. | G06F 21/572 |
| 2025/0156547 | A1* | 5/2025 | Cheng ..................... | G06F 21/52 |
| 2025/0156548 | A1* | 5/2025 | Liu ....................... | G06F 21/572 |

* cited by examiner

AUTHENTICATING COMMANDS TO CHANGE DEVICE FIRMWARE SETTINGS

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

DETAILED DESCRIPTION

Figure 1:
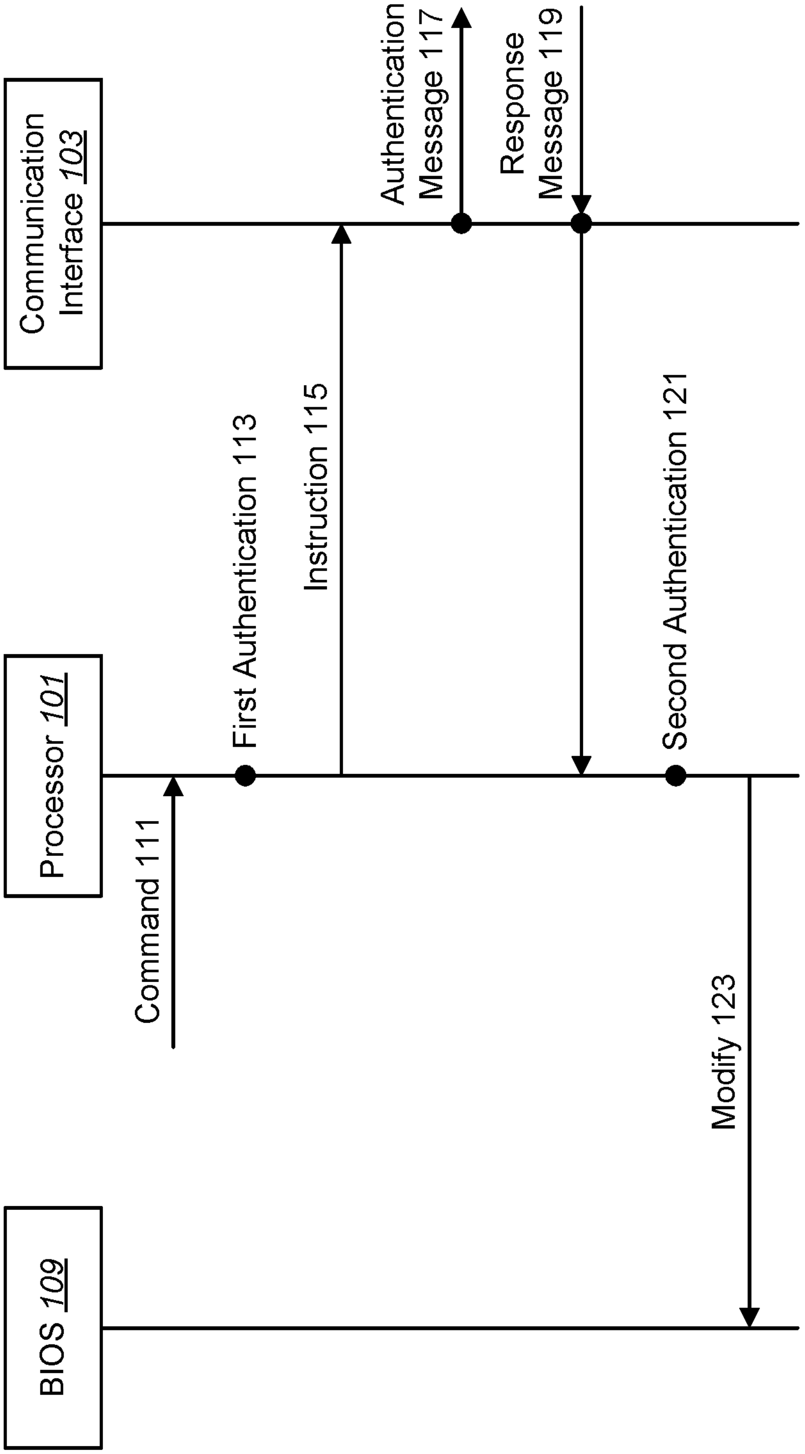
FIG. 1 is a thread diagram illustrating an example of command authentications in accordance with some examples of the techniques described herein.

In some approaches, firmware settings have a single path of authentication. For instance, a command may be sent to a BIOS or controller with a single password or signature. The command may be authenticated using the single password or signature and may be applied immediately or on the next boot. In some approaches, authentication may be handled locally in the BIOS or in a controller. If an attacker is able to send a remote setting change to the unit that passes the initial BIOS or controller authentication, the setting change may be applied due to the single authentication.

Some examples of the techniques described herein utilize a second authentication to be performed after a first authentication, and before a firmware setting change is applied. For instance, if an attacker is able to send a remote firmware change command, the command may be suspended awaiting a second authentication based on a communication with an external device. If a response is not received from the external device or if a denial is received from the external device (e.g., the change is denied or not confirmed from the external device, such as from a smartphone application), the command may continue to be suspended or may be aborted. Using a second authentication may enhance detection of malicious entities attempting to pass stolen legitimate credentials to compromise the firmware. For instance, the external device may display an alert for the second authentication (on a display device or display panel, for instance). In a case that the change command was not legitimately requested, a user may deny the second authentication, report the incident, change authentication (e.g., first authentication) credentials, or a combination thereof. Some examples of the techniques described herein may provide a multiple authentication scheme directly in a BIOS, controller (e.g., embedded controller), or combination thereof. For instance, some of the techniques described herein may enhance device security by using two authentications for modifying firmware settings or issuing secure commands.

Throughout the drawings, similar reference numbers may designate similar or identical elements. When an element is referred to without a reference number, this may refer to the element generally, without limitation to any particular drawing or figure. In some examples, the drawings are not to scale, and the size of some parts may be exaggerated to more clearly illustrate the example shown. Moreover, the drawings provide examples in accordance with the description. However, the description is not limited to the examples provided in the drawings.

FIG. 1 is a thread diagram illustrating an example of command authentications in accordance with some examples of the techniques described herein. FIG. 1 illustrates examples of a processor 101, a communication interface 103, and a Basic Input/Output System (BIOS) 109. In some examples, the processor 101, communication interface 103, and BIOS 109 may be components of an apparatus, electronic device (e.g., electronic device 202), or computing device (e.g., computing device 338).

An electronic device is a device that includes electronic circuitry (e.g., integrated circuitry). A computing device is an electronic device that includes a processor, logic circuitry, or a combination thereof. Examples of computing devices may include desktop computers, laptop computers, tablet devices, smartphones, televisions, game consoles, smart speakers, voice assistants, Internet of Things (IoT) devices, etc. A computing device may utilize processor(s) or logic circuitry to perform an operation or operations. In some examples, computing devices may execute instructions stored in memory to perform the operation(s). Instructions may be code or programming that specifies functionality or an operation of a processor or logic circuitry.

In some examples, data (e.g., information, instructions, or a combination thereof) may be stored in memory (e.g., volatile memory, non-volatile memory, or a combination thereof). Examples of memory may include Random Access Memory (RAM), Read-Only Memory (ROM), Erasable Programmable ROM (EPROM), Electrically Erasable Programmable ROM (EEPROM), flash memory, etc.), a storage device, an optical disc, the like, or a combination thereof. For instance, data may be stored in volatile or non-volatile memory, such as Dynamic Random Access Memory (DRAM), embedded MultiMediaCard (eMMC), magnetoresistive random-access memory (MRAM), phase change RAM (PCRAM), Synchronous Dynamic Random Access Memory (SDRAM), Double Data Rate (DDR) RAM, memristor, the like, or a combination thereof. In some examples, different memories (e.g., flash memories) in an electronic device may store separate data for same or different circuitries. For instance, instructions may be stored in Serial Peripheral Interface (SPI) flash memory, instructions may be stored in eMMC memory, or a combination thereof, etc. In some examples, memory may refer to a non-transitory tangible machine-readable storage medium, where the term "non-transitory" does not encompass transitory propagating signals.

In some examples, the processor 101, communication interface 103, and BIOS 109 may be coupled via an interface (e.g., bus(es), wire(s), connector(s), etc.). As used herein, the term "couple" or "coupled" may denote a direct connection (without an intervening component) or an indirect connection (with an intervening component(s)). In some examples, the processor 101 may be coupled to the communication interface 103 and to the BIOS 109 via a bus (e.g., serial peripheral interface (SPI) bus).

As used herein, "BIOS" refers to hardware or hardware and instructions to initialize, control, or operate a device (e.g., computing device, electronic device, etc.) prior to execution of an Operating System (OS) of the device. Instructions included within a BIOS may be software, firmware, microcode, or other programming that defines or controls functionality or operation of a BIOS. In one example, a BIOS may be implemented using instructions, such as platform firmware of a device, executable by a processor. A BIOS may operate or execute prior to the execution of the OS of a device. A BIOS may initialize, control, or operate components such as hardware components of a device and may load or boot the OS of a device.

In some examples, a BIOS may provide or establish an interface between hardware devices or platform firmware of the device and an OS of the device, via which the OS of the device may control or operate hardware devices or platform firmware of the device. In some examples, a BIOS may implement the Unified Extensible Firmware Interface (UEFI) specification or another specification or standard for initializing, controlling, or operating a device.

As used herein, an OS refers to hardware or hardware and instructions to control or operate a device (e.g., computing device, electronic device, etc.). For instance, an OS may operate after a boot procedure performed by the BIOS. Instructions included in an OS may be code or other programming that defines or controls functionality or operation of an OS. In some examples, an OS may be implemented using instructions executable by a processor (e.g., Central Processing Unit (CPU)).

As used herein, "firmware" refers to instructions, data, or a combination thereof. For instance, firmware may provide low-level (e.g., hardware-specific) instructions for control of a device. In some examples, firmware may be stored in non-volatile memory (e.g., ROM, flash memory, etc.). For instance, firmware may be stored in non-volatile memory attached to (e.g., soldered to) a motherboard of a device. Examples of firmware may include BIOS instructions, controller instructions, device settings, or a combination thereof, etc. In some examples, firmware may be stored separately from OS instructions.

A firmware setting is a setting in firmware. For instance, a firmware setting may be utilized to control an operational aspect of a device. Examples of firmware settings may include processor operating frequency, boot order, hardware controller settings, security settings, etc.

In some examples, the communication interface 103 may be a wired interface, wireless interface, Ethernet interface, Institute of Electrical and Electronics Engineers (IEEE) 802.11 (Wi-Fi) interface, Bluetooth interface, Universal Serial Bus (USB) interface, near field communication (NFC) interface, Category-M (CAT-M) interface, etc. The communication interface 103 may enable the electronic device (e.g., processor 101, BIOS 109, controller, etc.) to communicate with another device(s) (e.g., external device, remote device, peripheral device, etc.).

In some examples, the processor 101 may execute BIOS instructions to perform an operation or operations described herein. In some examples, BIOS instructions may be stored in a memory (e.g., flash memory, ROM, etc.) and may be executed by the processor 101 to perform a BIOS operation.

At step 111, the processor 101 receives a command. The command may be a command to modify firmware. For instance, the command may indicate a command to change a firmware setting, modify (e.g., update, change, etc.) the BIOS 109, modify a setting of the BIOS 109, execute a firmware instruction, etc. In some examples, the command is received from an OS. For instance, the command may be sent from an OS via Windows Management Instrumentation (WMI) or another mechanism. In some examples, the command may be received from another device via a wired or wireless link. For instance, the command may be received via the communication interface 103.

At step 113, the processor 101 may perform a first authentication. In some examples, performing the first authentication may be based on a password or code. In some examples, firmware (e.g., the BIOS 109, data in controller memory, etc.) may include a password or code that was stored previously (e.g., received from a user during a security setup procedure). The command may include, or may be accompanied by, a submitted password or code. For instance, the electronic device (e.g., peripheral interface, communication interface 103, etc.) may receive a submitted password or code from a peripheral device (e.g., keyboard, mouse, touchscreen, microphone, camera, scanner, etc.) or another device. The processor 101 may compare the submitted password or code to the stored password or code. If the submitted password or code matches the stored password or code, the first authentication may be successful. If the submitted password or code does not match the stored password or code, the first authentication may be unsuccessful.

In some examples, the processor 101 may perform the first authentication using a digital signature, digital certificate, or a combination thereof. A certificate is data that identifies an entity (e.g., certificate issuer, certificate authority (CA), another certificate, root certificate, etc.). A signature is a value (e.g., string of characters, number, etc.). For instance, a trusted entity may utilize a signing technique (e.g., signing program) to produce a signature based on content (e.g., certificate content, a command, a file, a hash, etc.). In some examples, the command may be signed or may be accompanied by a certificate.

In some examples, the electronic device may include a certificate store or certificate stores. A certificate store is a repository of a certificate(s) from a trusted certificate authority or authorities. For instance, the BIOS 109 (or controller memory) on the electronic device may include a certificate store or stores (e.g., database of cryptographic value(s)).

A signed command is a command accompanied by a signature. For instance, a signed command may be a programmatic instruction(s) signed by an entity. In some examples, the signature may be included in a certificate accompanying the signed command. The certificate may indicate a cryptographic value, an issuer identity, and the signature.

In some examples, the processor 101 may perform the first authentication using a certificate(s) from a certificate store on the electronic device. For instance, the processor 101 may read a certificate from the certificate store with an issuer identity that matches the issuer identity in a certificate of the signed command. In some examples, the processor 101 may determine that no certificate from the certificate store has an issuer identity that matches the issuer identity in a certificate of the signed command. In a case that no certificate from the certificate store has an issuer identity that matches the issuer identity in a certificate of the signed command, the first authentication may fail.

In some examples, the processor 101 may perform the first authentication using a certificate(s) if an issuer identity of a certificate from the certificate store matches the issuer identity in the certificate of the signed command. For instance, the processor 101 may decrypt the signature using the cryptographic value in the certificate with a matching issuer identity from the certificate store to produce a first hash. The processor 101 may hash contents (e.g., hash the instruction(s) of the signed command) to produce a second hash. In a case that the first hash and the second hash match, and the certificate from the certificate store is a root certificate, the first authentication may be successful. If the first hash and the second hash match and the certificate from the certificate store is an intermediate certificate, then verification may be performed recursively for the intermediate certificate (or an additional certificate(s) in a chain of trust) until the authentication succeeds with a root certificate or fails.

In the example of FIG. 1, the first authentication is successful. For instance, the password or code submitted with the command matches the stored password or code, or the signature of a signed command is verified successfully.

In response to the success of the first authentication, the processor 101 may instruct the communication interface 103 to send an authentication message to an external device at step 115. For instance, the processor 101 may send the authentication message to the communication interface 103 to be sent or may instruct the communication interface 103 to generate the authentication message. In some examples, the authentication message may include an indication of the received command, the modification indicated by the command, or a combination thereof. For instance, the authentication message may indicate the setting sought to be modified by the command, a timestamp when the command was received, the sender (e.g., OS, remote device, etc.) of the command, an identifier of the electronic device (e.g., universally unique identifier (UUID) of a motherboard or hardware device), or a combination thereof.

At step 117, the communication interface 103 may send the authentication message. For instance, the communication interface 103 may send the authentication message to an external device (e.g., server, computing device, smartphone, tablet device, etc.) via a wired or wireless link(s) (e.g., local area network (LAN), wide area network (WAN), the Internet, or a combination thereof, etc.). In some examples, the authentication message may be addressed to a device indicated by the electronic device (e.g., may be sent to an address or device indicator previously stored in the BIOS 109 or controller memory during a registration procedure). In some examples, the authentication message may be sent to a first external device (e.g., a web server with an authentication service), which may relay the authentication message to a second external device (e.g., smartphone). For example, a web server may utilize a UUID indicated by the authentication message to look up a corresponding account with a registered device and forward the authentication message to the registered device (e.g., second external device).

The external device may receive the authentication message. In some examples, the external device may produce an alert (e.g., displayed message, tone, haptic vibration, or a combination thereof). In some examples, the authentication message may be communicated (e.g., sent, received, or a combination thereof) as a text message, email, notification, hyperlink, etc. The external device may present information based on the authentication message. For instance, the external device may display a message indicating that a command was received to modify firmware, the commanded modification (e.g., setting change), a time that the command was received, an identifier of the electronic device (e.g., UUID or another identifier), or a combination thereof. In some examples, the external device may request information (e.g., a second password, timed authentication code from a third-party service, personal identification number (PIN), digital signature, certificate, etc.).

The external device may determine whether to confirm or deny the command. For instance, the external device may request an input (e.g., button click, tap, speech, gesture, motion, etc.) indicating whether to confirm or deny the command. The external device may receive an input indicating whether to confirm or deny the command. For instance, the external device may receive a tap on a touchscreen corresponding to a “confirm” button or a “deny” button. In some examples, the external device may receive a mouse click, a microphone input (e.g., recognized speech), a camera input (e.g., a recognized gesture), an accelerometer input (e.g., a recognized motion), or a combination thereof. In some examples, the external device may receive information (e.g., a second password, timed authentication code from a third-party service, PIN, digital signature, certificate, etc.).

In some examples, if an input is not received indicating whether to confirm or deny the command within a period of time (e.g., 1 minute, 5 minutes, 10 minutes, 30 minutes, an hour, a day, etc.), then a period to respond may expire. For instance, no response may be sent or an automatic denial response may be sent in a case that the period to respond expires.

In response to receiving an input (e.g., an input indicating to confirm or deny the command, information, or a combination thereof), the external device may send a response message to the electronic device. The response message may indicate whether to confirm or deny the command. For instance, if the external device receives an input confirming the command, then the external device may send a response message indicating that the command is confirmed (e.g., allowed, trusted, etc.). If the external device receives an input denying the command, then the external device may send a response message indicating that the command is denied (e.g., disallowed, untrusted, etc.). In some examples, the response message may include information (e.g., a second password, timed authentication code from a third-party service, PIN, digital signature, certificate, etc.). In some examples, the response message may be sent to the electronic device via a wired or wireless link(s) (e.g., LAN, WAN, the Internet, via a web server(s), etc.).

At step 119, the communication interface 103 receives the response message. The communication interface 103 may send the response message to the processor 101.

At step 121, the processor 101 performs a second authentication. For instance, the processor 101 may perform a second authentication based on the response message. In some examples, the second authentication may be performed based on whether the response message indicates a confirmation or denial of the command. For instance, if the response message indicates a confirmation, the second authentication may be successful. If the response message indicates a denial, the second authentication may fail. In some examples, the processor 101 may perform the second authentication based on information in the response message. For instance, the processor 101 may determine whether a second password matches a password stored in memory (which may be the same as or different from a password utilized for the first authentication), may determine whether a timed authentication code matches a code at the electronic device, may determine whether a digital signature or certificate can be verified successfully as similarly described above (where the digital signature or certificate may be the same as or different from a digital signature or certificate utilized in the first authentication), or a combination thereof.

In a case that the second authentication fails, the processor 101 may abort the command. For instance, the processor 101 may discard the command, remove the command from a queue or cache, not execute the command, etc.

In the example of FIG. 1, the second authentication is successful. In a case that the second authentication is successful, the processor 101 may modify the BIOS 109 at step 123. For instance, the processor 101 may execute the command to change a firmware setting, update firmware, etc.

Figure 2:
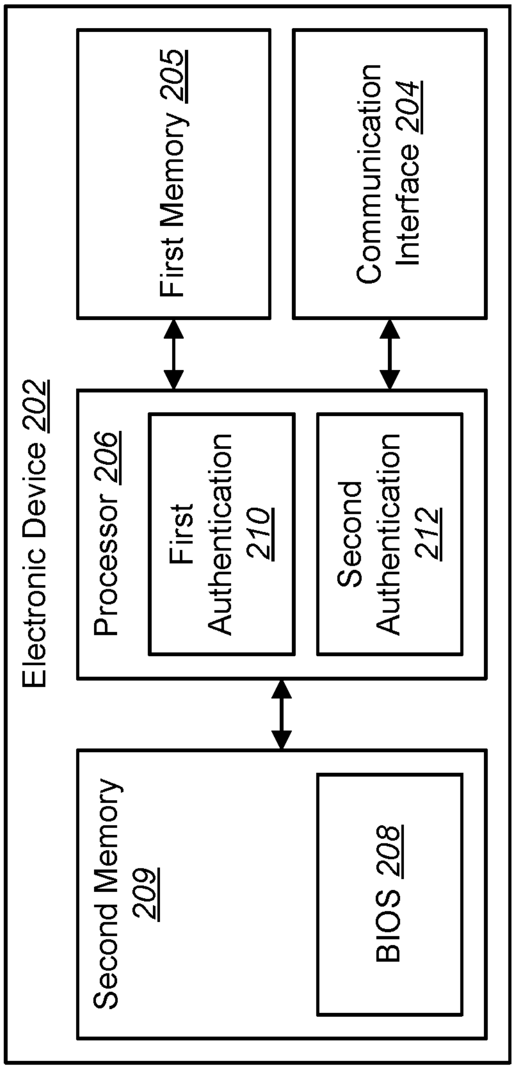
FIG. 2 is a block diagram illustrating an example of an electronic device that may be used to perform command authentications.

FIG. 2 is a block diagram illustrating an example of an electronic device 202 that may be used to perform command authentications. Examples of the electronic device 202 may include a computer (e.g., desktop computer, laptop computer, etc.), a smartphone, a tablet computer, a game console, etc. The electronic device 202 may include a communication interface 204, processor 206 (e.g., CPU), and a BIOS 208.

In some examples, the electronic device 202 may include a first memory 205 to store instructions (e.g., OS instructions). For instance, instructions may be stored in an electronic, magnetic, optical, other physical storage device, or a combination thereof, that contains or stores electronic data (e.g., information and instructions). The first memory 205 to store instructions may be, for example, RAM, EEPROM, a storage device, an optical disc, the like, or a combination thereof. In some examples, the first memory 205 may include multiple devices (e.g., a RAM card and a solid state drive (SSD)). In some examples, the first memory 205 may include data, instructions for execution by the processor 206, or a combination thereof. In some examples, the first memory 205 may be coupled to a motherboard of the electronic device 202 (via serial advanced technology attachment (SATA), parallel advanced technology attachment (PATA), integrated drive electronics (IDE), non-volatile memory express (NVMe), RAM slot(s), or a combination thereof, for instance).

The processor 206 may be a logic circuit. For instance, the processor 206 may be a logic circuit capable of performing logical operations. Examples of the processor 206 may include a field-programmable gate array (FPGA), application-specific integrated circuit (ASIC), CPU, controller, engine, etc. For instance, the processor 206 may be a CPU or another processor, controller, or engine. In some examples, the processor 206 may be coupled to a processor socket of a motherboard (not shown in FIG. 2) of the electronic device 202. In some examples, the processor 206 may be attached (e.g., soldered) to a motherboard of the electronic device 202.

In some examples, the electronic device 202 may include a second memory 209 to store firmware instructions (e.g., BIOS 208 instructions, controller instructions, etc.). In some examples, the second memory 209 may be non-volatile memory circuitry, EPROM, EEPROM, eMMC, flash memory, or a combination thereof. For example, firmware instructions may be stored in NAND flash memory or NOR flash memory. In some examples, the second memory 209 may be attached (e.g., soldered) to a motherboard of the electronic device 202. In some examples, the BIOS 208 may include firmware (e.g., firmware executable by the processor 206 to boot the electronic device 202). In some examples, the first memory 205 may be separate from the second memory 209 to store firmware instructions. In some examples, the first memory 205 may have a larger storage capacity than the second memory 209 to store firmware instructions.

The processor 206 may be coupled to the first memory 205 and to the second memory 209. For instance, the processor 206 may be coupled to the first memory 205 and the second memory 209 with an interface, wire, bus, or a combination thereof. In some examples, the processor 206 may be coupled to the first memory 205 and the second memory 209 with a serial peripheral interface (e.g., SPI or eSPI) bus. For instance, the electronic device 202 may include a serial peripheral interface bus, where the processor 206 may access the first memory 205 via the serial peripheral interface bus, may access the second memory 209 via the serial peripheral interface bus, or may perform a combination thereof.

The processor 206 may receive a command to modify a setting of the BIOS 208. For instance, the processor 206 may receive a command via an OS, the communication interface 204, or a combination thereof as described in FIG. 1. In some examples, the command is submitted from the OS (after booting, for instance). In some examples, the command may be submitted to the processor 206 in a pre-boot environment. In response to receiving the command to modify the setting of the BIOS 208, the processor 206 may perform a first authentication 210. For instance, the processor 206 may perform the first authentication 210 using a password, code, digital signature, certification, or a combination thereof as described in FIG. 1. The first authentication 210 may result in a first success or a failure.

In some examples, the processor 206 may cache the command pending an authentication success. For instance, the processor 206 may store the command in a cache (e.g., queue) in the first memory 205 or in the second memory 209. In some examples, the processor 206 may cache the command pending a second success of a second authentication 212. For instance, the command may be cached pending disposal (e.g., execution and removal in a case of a second success, or discarding in a case of an authentication failure).

In some examples, the processor 206 may instruct the communication interface 204 to send an authentication message to an external device in response to a first success of the first authentication 210. For instance, the processor 206 may instruct the communication interface 204 as described in FIG. 1. In some examples, the authentication message may cause the external device to request a confirmation to modify the setting. The external device may send a response message in response to an input indicating the confirmation to modify the setting. As described in FIG. 1, for instance, the external device may produce a response message that may be sent to the electronic device 202 (e.g., communication interface 204) in response to the authentication message.

The processor 206 may perform a second authentication 212 based on the response message from the external device. For instance, the processor 206 may perform the second authentication 212 based on whether the response message indicates a confirmation or denial, second password, second digital signature or certificate, etc., as described in FIG. 1. The second authentication 212 may result in a second success or a failure.

In some examples, the first authentication 210 and the second authentication 212 are performed in a pre-boot environment. For instance, the first authentication 210 and the second authentication 212 may be performed on the electronic device 202 previous to booting an OS. In some examples, the first authentication 210 and the second authentication 212 are performed after booting an OS.

In response to a second success of the second authentication 212, the processor 206 may modify the setting of the BIOS 208. For instance, the processor 206 may execute the command to modify the BIOS 208. In some examples, the command is executed and removed from the cache in response to the second success.

In some examples, the electronic device 202 may perform one, some, or all of the aspects, operations, elements, etc., described in one, some, or all of FIG. 1-5. In some examples, the electronic device 202 may include an element described in one, some, or all of FIG. 1-5.

Figure 3:
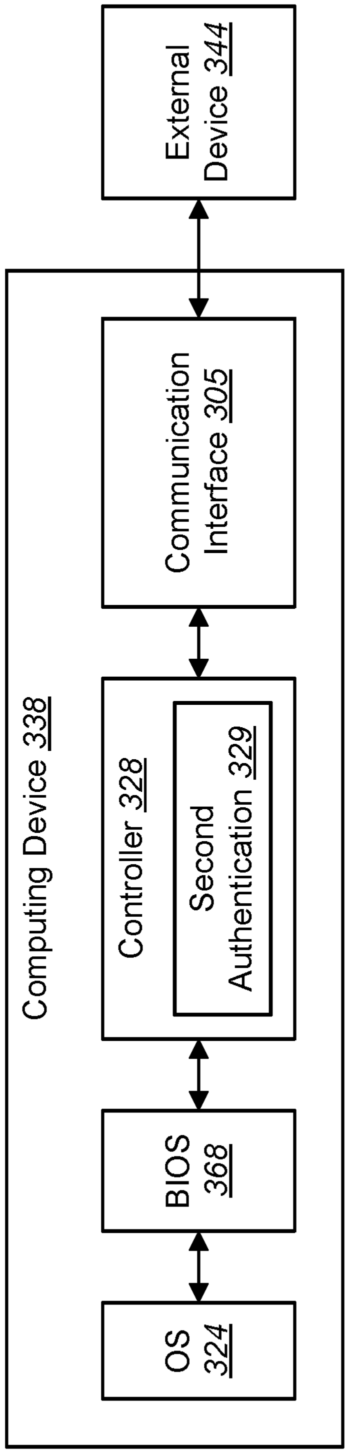
FIG. 3 is a block diagram illustrating an example of a computing device to perform command authentications.

FIG. 3 is a block diagram illustrating an example of a computing device 338 to perform command authentications. In some examples, the computing device 338 may perform the operations described in FIG. 1, FIG. 2, FIG. 4, FIG. 5 or a combination thereof. The computing device 338 may be an example of the electronic device 202 described in FIG. 2. In some examples, the computing device 338 may include a controller 328, an OS 324, a BIOS 368, and a communication interface 305.

Examples of the computing device 338 may include a computing device, smartphone, laptop computer, tablet device, mobile device, etc. In some examples, one, some, or all of the components of the computing device 338 may be structured in hardware (e.g., circuitry). In some examples, the components described in FIG. 3 may be examples of corresponding components described in FIG. 1, FIG. 2, or a combination thereof. In some examples, the computing device 338 may perform one, some, or all of the operations described in FIG. 1-5.

In some examples, the controller 328, OS 324, and BIOS 368 may be coupled by a bus (e.g., wire(s)). Examples of the bus may include an SPI bus, eSPI bus, inter-integrated circuit (I2C) bus, general purpose input/output (GPIO) bus, or a combination thereof, etc. The bus may be utilized to communicate a signal, information, or a combination thereof. In some examples, the electronic device 202 may include a coupling(s) in addition to the bus or independently from the bus.

In some examples, OS data may be stored in RAM, a hard disk drive (HDD), NVMe memory, or a combination thereof, etc. OS data may include information, instructions, or a combination thereof to provide an OS for the computing device 338. For instance, the computing device 338 may include an OS. In some examples of FIG. 3, an "OS" may refer to a processor (not shown in FIG. 3) executing instructions in the OS data to perform an operation(s).

In some examples, BIOS data may be stored in ROM, EPROM, EEPROM, flash memory, or a combination thereof, etc. For instance, BIOS data may include information, instructions, or a combination thereof to provide low-level operations for the computing device 338. In some examples of FIG. 3, the BIOS 368 may refer to a processor (e.g., CPU) executing instructions in the BIOS 368 to perform an operation(s).

In some examples, the controller 328 may receive a command from the OS 324 to modify a firmware setting. For instance, the OS 324 (via WMI or another mechanism, for example) may execute a command to change a firmware setting.

In response to receiving the command from the OS 324 to modify a firmware setting, the BIOS 368, the controller 328, or a combination thereof may perform a first authentication. For instance, the BIOS 368, the controller 328 or a combination thereof may authenticate command to modify the firmware setting using a password, signature, certificate, or a combination thereof. For instance, the BIOS 368, the controller 328, or a combination thereof may perform the first authentication as described in FIG. 1, FIG. 2, or a combination thereof.

In response to a first success of the first authentication, the controller 328 may cache the command. For instance, the controller 328 may cache the command in a queue in memory (e.g., in a queue in controller memory or other memory).

The controller 328 may instruct the communication interface 305 to send an authentication message to an external device 344. For instance, the controller 328 may send an authentication message over a network to the external device 344 (e.g., smartphone with an application) that is responsible for the confirmation of the command. In some examples, the authentication message may indicate (e.g., identify) the command to modify the firmware setting. The external device 344 may confirm or deny the command. For instance, the external device 344 may send a response message back to the controller 328 (via the communication interface 305, for example) over the network. The external device 344 may take different forms in different examples. For instance, the external device 344 may be a network server in one example or a smartphone with an application in another example. In some examples, a network server may be helpful for organizations including many managed computing devices. For instance, the network server may contain records of commands (to modify firmware, for instance) sent out and may use those records to confirm a legitimate command. A smartphone with an application may be helpful to users who are managing their own computing device. For instance, a user may receive a notification of the command to modify a firmware setting through the application, and from there may confirm whether the command was legitimate.

In some examples, a timeout mechanism may be utilized. For instance, the authentication message sent by the controller 328 may expire after a period of time. If a response message is not received by the end of the period, the setting will not be modified, for instance.

The controller 328 may perform a second authentication 329 based on a response message from the external device 344. For instance, the controller 328 (e.g., embedded controller) may process the signal that was returned from the external device 344. For instance, the second authentication 329 may be performed as described in FIG. 1 or FIG. 2.

In response to a second success of the second authentication 329, the controller 328 may modify the firmware setting. For instance, if the command to modify the firmware setting was confirmed, the controller 328 may update the firmware setting. If a command to modify the firmware was rejected, the controller 328 will not update the firmware setting, for instance. In some examples, the firmware setting may be stored in controller memory (e.g., memory specific to the controller 328). In some examples, the firmware setting may be stored in the BIOS 368 of the computing device 338. To facilitate multiple setting change commands, the controller 328 may store and keep track of currently pending commands (e.g., active requests).

Some examples of the techniques described herein may utilize a controller 328 (e.g., security controller) or secure operating environment (e.g., System Management Mode (SMM), UEFI pre-boot, a hypervisor, or a combination thereof) to enhance firmware authentication with a second authentication 329, where the second authentication 329 is approved or performed based on an external device 344 (e.g., separate computing device). The controller 328 or secure operating environment may establish a secure communication channel with the external device 344 using the communication interface 305 (e.g., wireless networking, NFC, Bluetooth, etc.). In some examples, the controller 328, the external device 344, or a combination thereof may pass some random data (between the controller 328 and the external device 344, for instance) such that an attacker cannot simply replay previous authentication data to bypass the second authentication 329.

Some examples of the techniques described herein may secure users against malicious attacks directed at modifying firmware settings. Even an attacker who manages to gain physical access to the computing device 338 may be unable to change settings without having access to the external device 344. Some examples of the techniques described herein may provide an enhancement to pre-boot authentication screens. Without authentication, some devices may be vulnerable to settings changes via malicious OS code that has intercepted user credentials.

Figure 4:
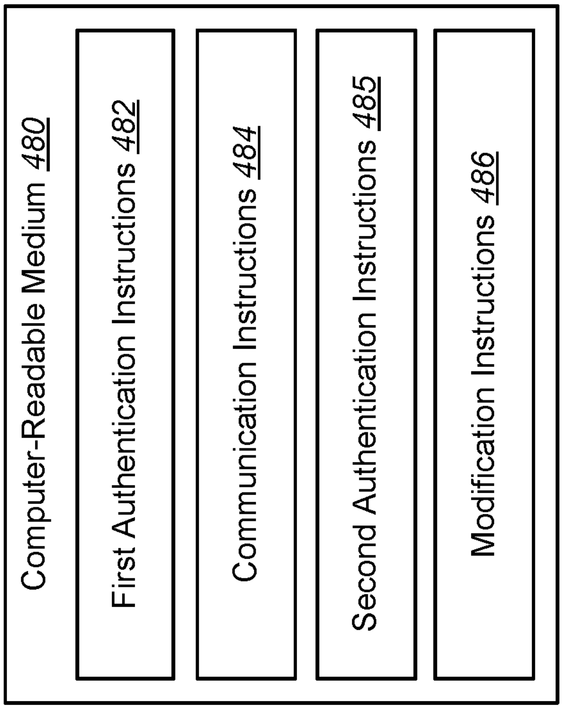
FIG. 4 is a block diagram illustrating an example of a computer-readable medium for command authentications.

FIG. 4 is a block diagram illustrating an example of a computer-readable medium 480 for command authentications. The computer-readable medium 480 is a non-transitory, tangible computer-readable medium. In some examples, the computer-readable medium 480 may be, for example, RAM, DRAM, EEPROM, MRAM, PCRAM, a storage device, an optical disc, the like, or a combination thereof. In some examples, the computer-readable medium 480 may be volatile memory, non-volatile memory, or a combination thereof. In some examples, the computer-readable medium 480 described in FIG. 4 may be an example of memory including instructions to be executed by a processor to authenticate a command. For instance, the computer-readable medium 480 may be an example of controller memory, memory to store firmware, or a combination thereof.

The computer-readable medium 480 may include data (e.g., information, instructions). In the example of FIG. 4, the computer-readable medium 480 includes first authentication instructions 482, communication instructions 484, second authentication instructions 485, and modification instructions 486.

The first authentication instructions 482 may include instructions when executed cause a controller (e.g., embedded controller) of an electronic device to perform a first authentication in response to receiving a command to modify a firmware setting from an OS. In some examples, performing the first authentication may be performed as described in FIG. 1, FIG. 2, FIG. 3, FIG. 5, or a combination thereof. In some examples, the computer-readable medium 480 may include instructions when executed cause the controller to hold the command in a queue.

The communication instructions 484 may include instructions when executed cause the controller to instruct a communication interface to send an authentication message to an external device in response to a first success of the first authentication. In some examples, instructing the communication interface may be performed as described in FIG. 1, FIG. 2, FIG. 3, FIG. 5, or a combination thereof.

The second authentication instructions 485 may include instructions when executed cause the controller to determine a second success of a second authentication in a case that a response message is received from the external device. In some examples, performing the second authentication may be performed as described in FIG. 1, FIG. 2, FIG. 3, FIG. 5, or a combination thereof.

The modification instructions 486 may include instructions when executed cause the controller to modify the firmware setting in response to the second success. In some examples, modifying the firmware setting may be performed as described in FIG. 1, FIG. 2, FIG. 3, FIG. 5, or a combination thereof. In some examples, the controller may execute the command and remove the command from the queue in response to the second success.

Figure 5:
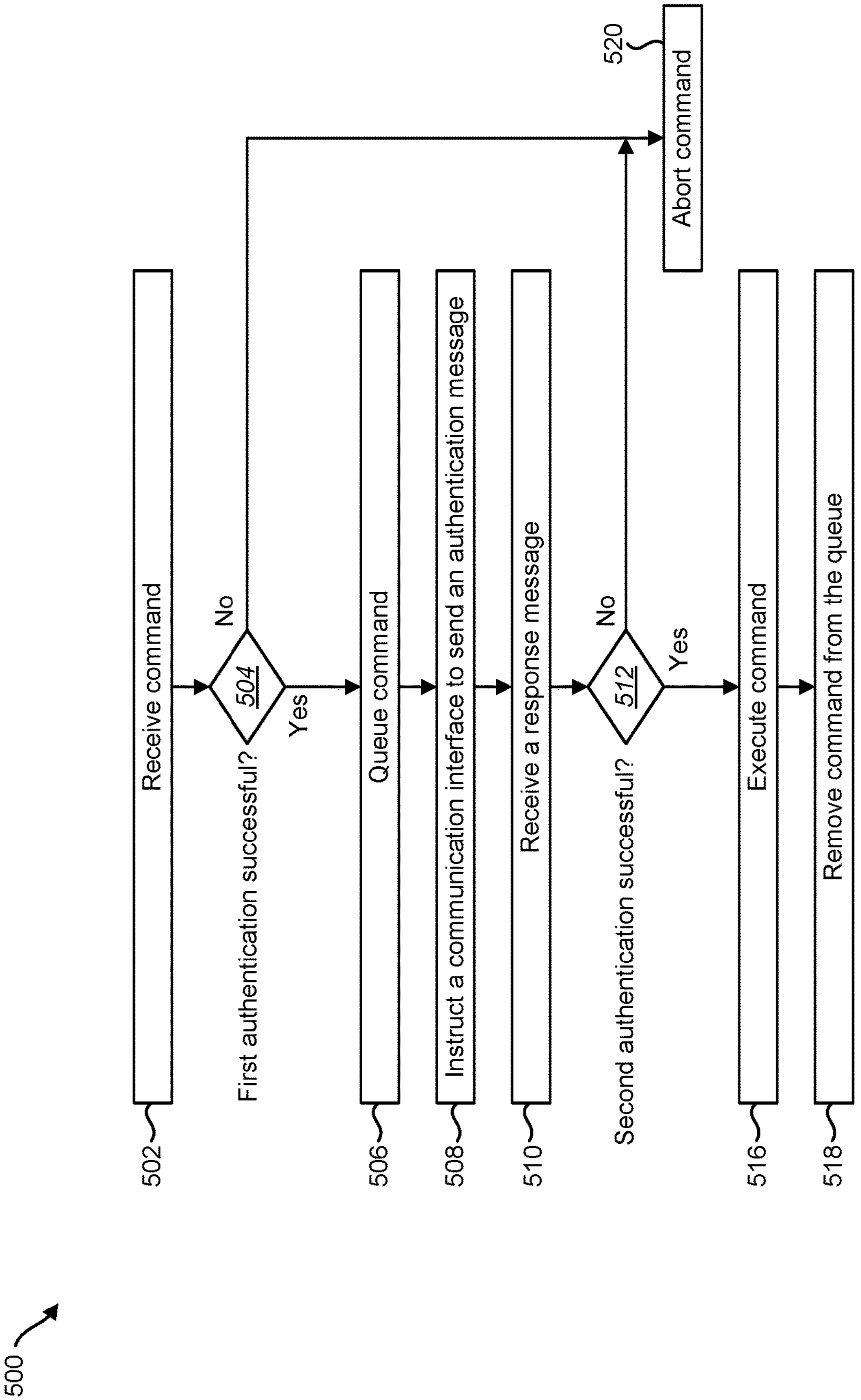
FIG. 5 is a flow diagram illustrating an example of a method for command authentications.

FIG. 5 is a flow diagram illustrating an example of a method 500 for command authentications. The method 500 or a method 500 element may be performed by an electronic device, computing device, or apparatus (e.g., electronic device 202, computing device 338, laptop computer, smartphone, tablet device, smartphone, etc.). For example, the method 500 may be performed by the electronic device 202 described in FIG. 2 or the computing device 338 described in FIG. 3.

At step 502, an electronic device may receive a command. For instance, a controller (e.g., embedded controller) may receive a command from an OS (via a BIOS, for example) or from another device. The command may indicate a modification to firmware (e.g., a BIOS, controller instructions, etc.).

At step 504, the electronic device may determine whether a first authentication is successful. For instance, a controller may determine whether a first authentication is successful as described in FIG. 1, FIG. 2, FIG. 3, FIG. 4, or a combination thereof. In a case that it is determined that the first authentication is unsuccessful (e.g., fails), the electronic device may proceed to abort the command at step 520.

In a case it is determined that the first authentication is successful, the electronic device may queue the command at step 506. In some examples, queuing a command may be accomplished as described in FIG. 1, FIG. 2, FIG. 3, FIG. 4, or a combination thereof.

At step 508, the electronic device may instruct a communication interface to send an authentication message. In some examples, instructing the communication interface may be accomplished as described in FIG. 1, FIG. 2, FIG. 3, FIG. 4, or a combination thereof.

At step 510, the electronic device may receive a response message. In some examples, receiving the response message may be accomplished as described in FIG. 1, FIG. 2, FIG. 3, FIG. 4, or a combination thereof.

At step 512, the electronic device may determine whether a second authentication is successful. In some examples, determining whether the second authentication is successful may be accomplished as described in FIG. 1, FIG. 2, FIG. 3, FIG. 4, or a combination thereof.

In a case that the second authentication is unsuccessful (e.g., fails), the electronic device may abort the command at step 520. In some examples, aborting the command may be accomplished as described in FIG. 1, FIG. 2, FIG. 3, FIG. 4, or a combination thereof.

In a case that the second authentication is successful, the electronic device may execute the command at step 516. In some examples, executing the command may be accomplished as described in FIG. 1, FIG. 2, FIG. 3, FIG. 4, or a combination thereof. For instance, the electronic device (e.g., controller) may modify firmware as instructed by the command.

At step 518, the electronic device may remove the command from the queue. In some examples, removing the command may be accomplished as described in FIG. 1, FIG. 2, FIG. 3, FIG. 4, or a combination thereof.

As used herein, items described with the term "or a combination thereof" may mean an item or items. For example, the phrase "A, B, C, or a combination thereof" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operation(s), function(s), aspect(s), or element(s) of the examples described herein may be omitted or combined.

The invention claimed is:

1. An electronic device, comprising:
a communication interface;
a Basic Input/Output System (BIOS); and
a processor to:
in response to receiving a command to modify a setting of the BIOS, perform a first authentication of the command;
instruct the communication interface to send an authentication message to an external device in response to a first success of the first authentication, wherein the authentication message causes the external device to request a user of the external device to confirm the command;
perform a second authentication of the command based on a response message from the external device, wherein the response message indicates that the user of the external device confirmed the command; and
in response to a second success of the second authentication, modify the setting of the BIOS.

2. The electronic device of claim 1, wherein the processor is to cache the command pending the second success of the second authentication.

3. The electronic device of claim 2, wherein the processor is to execute the command and remove the command from the cache in response to the second success.

4. The electronic device of claim 1, wherein the command is submitted from an Operating System (OS).

5. The electronic device of claim 1, wherein the first authentication and the second authentication are performed in a pre-boot environment.

6. The electronic device of claim 1, wherein the first authentication and the second authentication are performed after booting an Operating System (OS) of the electronic device.

7. The electronic device of claim 1, wherein the processor is to instruct the communication interface to route the authentication message to the external device via a web server.

8. The electronic device of claim 1, wherein the setting of the BIOS is stored in the BIOS of the electronic device.

9. The electronic device of claim 7, wherein the authentication message comprises a timestamp indicative of when the command was received.

10. A computing device, comprising:
a communication interface;
an Operating System (OS);
a Basic Input/Output System (BIOS); and
a controller to:
in response to receiving a command from the OS to modify a firmware setting, perform a first authentication of the command;
in response to a first success of the first authentication, cache the command;
instruct the communication interface to send an authentication message to an external device, wherein the authentication message causes the external device to request a user of the external device to confirm the command;

perform a second authentication of the command based on a response message from the external device, wherein the response message indicates that the user of the external device confirmed the command; and
in response to a second success of the second authentication, modify the firmware setting.

11. The computing device of claim 10, wherein the firmware setting is stored in a memory of the controller.

12. The computing device of claim 10, wherein the firmware setting is stored in the BIOS of the computing device.

13. The computing device of claim 10, wherein the authentication message indicates the command to modify the firmware setting.

14. The computing device of claim 10, wherein the controller is to perform the first authentication and the second authentication in a pre-boot environment of the computing device.

15. The computing device of claim 10, wherein the controller is to instruct the communication interface to route the authentication message to the external device via a web server.

16. A non-transitory computer-readable storage medium comprising instructions that, when executed by a controller of an electronic device, cause the electronic device to:
in response to receiving a command to modify a firmware setting of the electronic device from an Operating System (OS) of the electronic device, perform a first authentication of the command;
instruct a communication interface of the electronic device to send an authentication message to an external device in response to a first success of the first authentication, wherein the authentication message causes the external device to request a user of the external device to confirm the command;
determine a second success of a second authentication of the command based on a response message that is received from the external device, wherein the response message indicates that the user of the external device confirmed the command; and
in response to the second success, modify the firmware setting of the electronic device.

17. The non-transitory computer-readable storage medium of claim 16, wherein the instructions, when executed by the controller of the electronic device, cause the electronic device to hold the command in a queue.

18. The non-transitory computer-readable storage medium of claim 17, wherein the instructions, when executed by the controller of the electronic device, cause the electronic device to execute the command and remove the command from the queue in response to the second success.

19. The non-transitory computer-readable storage medium of claim 16, wherein the instructions, when executed by the controller of the electronic device, cause the electronic device to instruct the communication interface of the electronic device to route the authentication message to the external device via a web server.

20. The non-transitory computer-readable storage medium of claim 16, wherein the instructions, when executed by the controller of the electronic device, cause the electronic device to perform the first authentication and the second authentication in a pre-boot environment of the electronic device.

* * * * *